D. R. YARNALL.
VALVE.
APPLICATION FILED FEB. 27, 1912.
1,103,120.
Patented July 14, 1914.
2 SHEETS—SHEET 1.
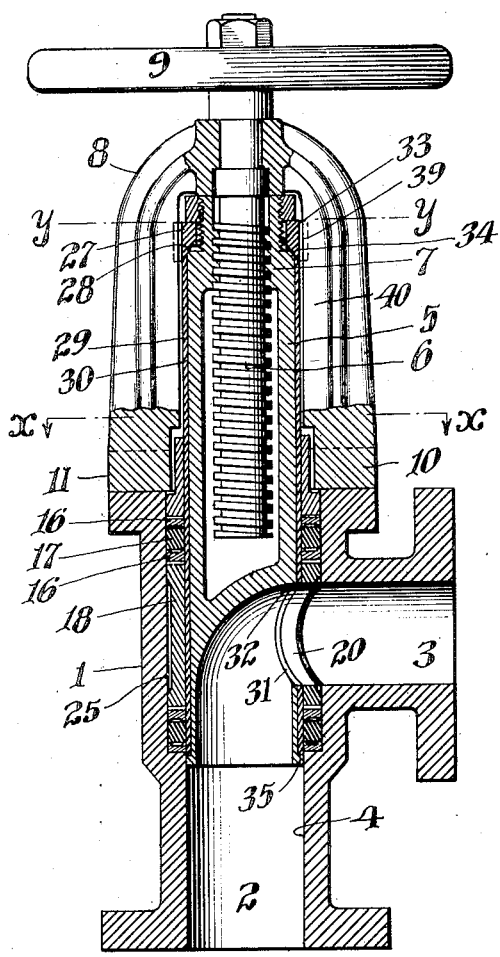
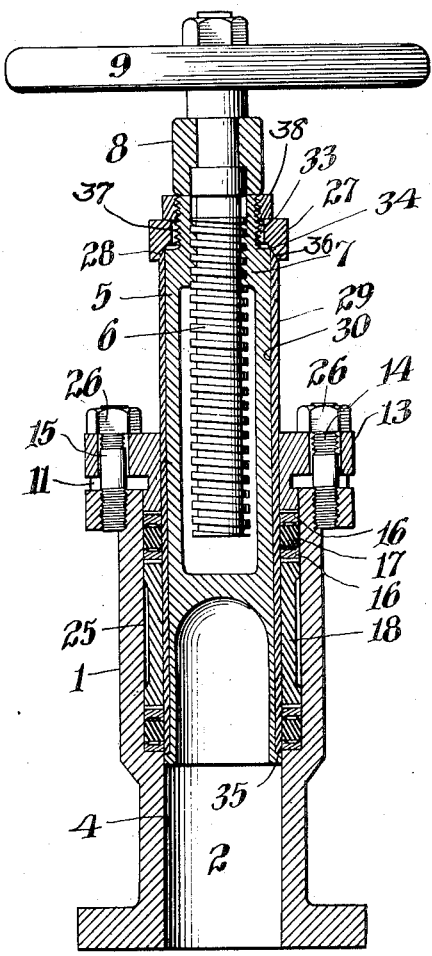
WITNESSES
INVENTOR
David Robert Yarnall
BY
Wm Steell Jackson
ATTORNEY

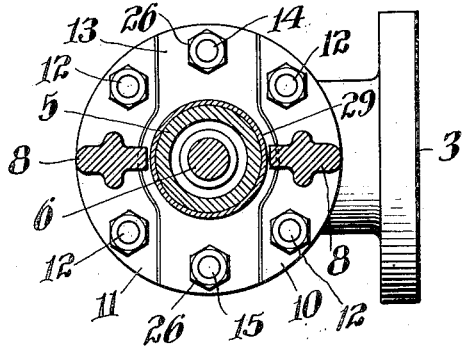
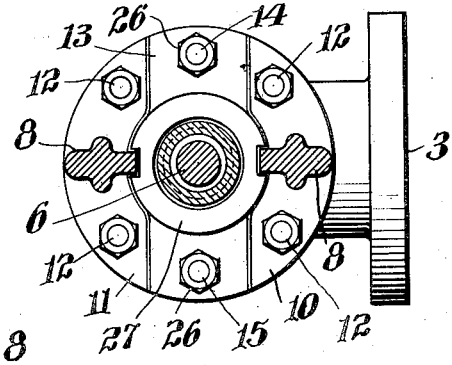
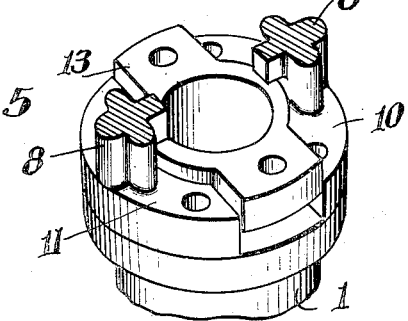
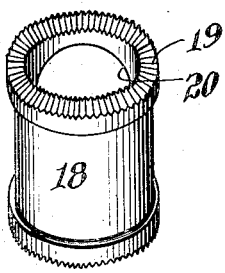
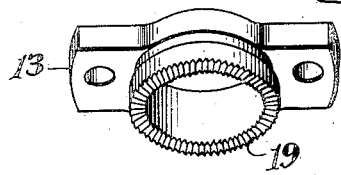
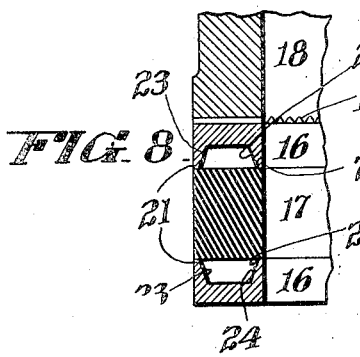
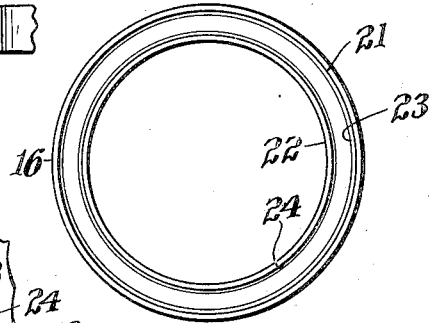
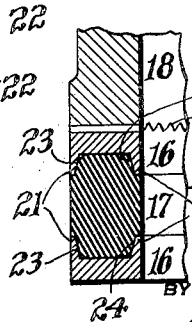

UNITED STATES PATENT OFFICE.

DAVID ROBERT YARNALL, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA.

VALVE.

1,103,120.  Specification of Letters Patent.  Patented July 14, 1914.

Application filed February 27, 1912. Serial No. 680,348.

*To all whom it may concern:*

Be it known that I, DAVID ROBERT YARNALL, a citizen of the United States, and a resident of Philadelphia, Pennsylvania, have invented a certain new and useful Valve, of which the following is a specification.

The purpose of my invention is to improve the sealing qualities of a valve.

A further purpose of my invention is to provide a removable outer shell or cover for the valve plug with means for preventing leakage thereabout and improper movement thereof.

A further purpose of my invention is to prevent the rotation of valve packing and intermediate parts during the seating and adjustment of the packing.

A further purpose of my invention is to combine composition and metallic packings so as to make the sealing more effective and reduce the friction upon the valve.

A further purpose of my invention is to use composition packing to expand or laterally spread metallic packing, sealing with the metallic packing as much as possible to reduce the friction.

A further purpose of my invention is to locate an expander or laterally spreading member, preferably itself a packing, against one or between two packings which is or are to be expanded or laterally spread.

A further purpose of my invention is to make the stuffing box independent of the yoke in a valve, freeing the valve operating mechanism from interference thereby.

A further purpose of my invention is, with a member separate from the yoke, to give additional compression to the packing at the time the valve is closed, with immediate relief therefrom when the valve begins to open.

A further purpose of my invention is, while maintaining the yoke, to provide for tightening of the packing by the movement of the valve-operating parts or valve supplemental to and independent of the tightening and adjusting means for the stuffing box, i. e., bolts or studs, and coincidentally with the closure of the valve permitting the use of the bolts or studs for the tightening or for follow-up purposes at will.

I have preferred to illustrate my invention by one simple and relatively inexpensive form thereof which well illustrates the principles of the invention, and which in actual construction has been found by me to be effective and eminently satisfactory.

Figure 1 is a central longitudinal section of the preferred form of my invention through the inlet and outlet openings. Fig. 2 is a longitudinal section at right angles to Fig. 1. Fig. 3 is a section taken upon line $x$—$x$ of Fig. 1. Fig. 4 is a section taken upon line $y$—$y$ of Fig. 1. Fig. 5 is a broken perspective view of the stuffing box and related parts. Fig. 6 is a perspective view of the stuffing box shown in Fig. 1. Fig. 7 is a perspective view of a ring shown in Fig. 1. Fig. 8 is a broken enlarged section showing a portion of the packing of Fig. 1. Fig. 8a is a section showing the parts of Fig. in another position. Fig. 9 is a plan view of one of the metallic packing rings shown in Fig. 1. Fig. 9a is a broken section of another form of ring.

The same numerals of reference indicate like parts in the drawing.

Describing the preferred form of my invention illustrated: The valve body 1 may be of any of a variety of known forms provided with inlet and outlet openings 2 and 3, preferably at right angles to each other with the opening 2 in line with the axis of the plug valve and the same size as the bore 4 of the valve; and in which the opening 3 is usually the inlet opening, in order that the pressure, when the valve is closed, shall be transverse to the valve. Within the bore 4 the plug 5 is operated, preferably by screw 6 engaging with a nut 7 in the upper end of the plug. With this construction, the screw is supported and swiveled in yoke 8 so as to be operated by any suitable device as wheel 9. Obviously this structure may be varied considerably.

The yoke is supported upon the body by any suitable base, here divided into two parts 10, 11, between which the stuffing box lies. The yoke is secured to the body by studs 12. The yoke is thus fixed in position and the screw feeds the plug valve in unvarying direction, an effective feature in connection with the extra compression of the packing when the valve is closed, hereinafter referred to, since the compression of the packing is thus made uniform and the line of feed of the valve is never tilted out of true axial position with respect to the bore of the valve and packing.

In order that the yoke may not vary angularly, I prefer thus to fix it longitudinally also and bolt it tightly to the valve body obtaining the very desirable extra compression of the packing with operation of the movable valve parts by separating the stuffing box 13 from the yoke and placing it between the divided parts 10, 11 of the yoke, and causing a part movable with the valve to engage it when the valve is closed. At other times I tighten the stuffing box and retain it by means of studs 14, 15.

In order to avoid possible turning movement of the metallic packing rings 16, composition packing 17 and ring 18, I knurl or otherwise roughen the engaging end or ends of the harder materials as at 19, ordinarily roughening the end of the stuffing box and the two ends of the ring, and these only. I find that this is effective to maintain the ring 18 in position with its outlet opening 20 in line with the bore of the opening 3. It will be recognized that the total movement of this ring during the tightening and following up of the packing beneath it is not sufficient to disturb the substantial vertical registration of the opening 20 and the bore of 3.

I have found that the soft or composition packing 17 ordinarily used, while it may easily be made effective to stop leakage, brings undue friction upon the plug valve which must be moved against it, and that, if the axial extent of engagement of this composition packing with the plug be kept low, much greater ease of operation of the valve may be secured. As the composition packing is quite desirable in combination with metallic packing, to stop seepage, and I prefer not to drop its use altogether, I have discovered that a most desirable combination is effected by using the composition packing as an expander for the metallic packing, and, in this use, am able to relatively extend the axial length of metallic packing as compared with the axial length of composition packing engaging the valve. The metallic packing could be expanded by other material than the composition packing placed as a collar or "floater" in the same relation to it, gaining part of the benefit of my invention, particularly in the expansion of packing upon both sides axially of the collar, but losing the packing function of the expanding material, and, with most materials otherwise useful for such collar or "floater," the expansion would not be as advantageously attained as with the composition packing.

In the form illustrated, I concave or gutter as Fig. 9, or wedge upon one side only, as in Fig. 9ª, that face or those faces of the metallic packing ring or rings 16 which adjoin the composition packing so as to provide annular ribs or flanges preferably both upon the inner and outer edges, as at 21 and 22, shown as having sloping inner walls 23 and 24, giving them wedge sections. They hold the composition packing in. The composition packing is pressed between the preferably converging walls of these ribs or flanges, by the movement of the stuffing box, so as to force the rib or ribs or flanges against the wall of the bore 25 and the surface of the plug respectively, relatively increasing the proportion of metallic packing as compared with the composition packing engaging the bore and plug. This provides effective tightening means for the metallic packing to keep it forced radially against the wall of the bore and plug, or one of them, (Fig. 9ª) taking up the wear and maintaining a steam tight joint with a minimum of friction. When one edge only is ribbed, I prefer to wedge the inner edge as the wear takes place there.

While the stuffing box 13 can be tightened upon the packing to any extent desired by means of the nuts 26 and can be maintained in as tight adjustment as desired, this means for tightening and adjustment is subject to objection because of the difficulty in tightening uniformly and the temporary tendency to rock the stuffing box or tilt it by tightening upon one nut when the other is not being tightened. I provide for tightening of the stuffing box by engagement therewith of any device, here shown as clamp 27, movable with the valve and so placed longitudinally upon it as to engage at its lower end with the upper surface of the stuffing box, so that the stuffing box may be seated evenly and tightened uniformly by movement of the valve plug to closed position. This permits the nuts 26 to be subsequently tightened, while the pressure upon the stuffing box is maintained, and its even position may be thus insured. In addition to permitting easy, even and effective initial tightening of the stuffing box when the valve is closed by operation of the wheel 9, for general purposes, I obtain a special advantage from this engagement with the stuffing box of a part moving with the plug valve, since the final movement of the valve results in an additional compression of the packing through the stuffing box which compression need not be maintained but insures a particularly tight joint at the time that the valve is closed, when this joint is most needed. As soon as opening movement of the valve begins, this additional compression is relieved; and I have found that the elasticity or spring of the packing is sufficient to cause it to continue to expand longitudinally of the valve axis to take up the looseness of the nuts 26, after each such release, and to maintain an easy steam tight fit against the plug valve notwithstanding that a tighter fit has been maintained during the time the valve was closed. The means carried by the valve for initially "setting" the stuffing box and for additionally compressing the packing operates when the valve is closed, only.

In order to secure good outside surfacing for the plug valve, free from pitting, rusting or other injury by reason of the action of the water or fluid handled, it has become customary in the best constructions to provide a plug valve of solid material unaffected by the fluid or to plate the outside of a baser metal with copper or other suitable material. Both ways are expensive. In the latter form the surface must be machined first, then plated and then again machined.

I have invented a cheap and effective means of coating or covering the outer surface of the plug valve by means of a casing, sleeve, shell or tubing 29 placed about the reduced surface 30 of the plug valve. My invention includes also effective means for preventing turning movement and leakage of and about this tubing. The movement would cause the opening 31 to cease to register with the bore of inlet opening 3. However, many simple means of preventing movement will occur to any mechanic. The leakage would permit fluid to pass between the plug core and casing, or coating, entering, say at 32, and finding an exit to the outside of the valve at 33. I overcome both of these dangers and objections, preferably by making the casing, sleeve or shell 29, of relatively thin material and forcing collar or clamp 27 against the tube or shell, preferably tapering the interior of the clamp, as at 34 for engagement with the end of the tube or shell to maintain the desired seal between it and the body or core of the plug valve.

The casing, sleeve or shell 29 rests against a shoulder or flange 35 at the lower end of the plug core. I have found that the engaging surfaces at this point ordinarily need not be tapered as there is chance for leakage between the plug core and shell above, opposite the opening 3 and leakage at the bottom need not be specially guarded.

The preferably tapered clamp 27 engages with a preferably tapered upper extremity 36 of the casing, sleeve or shell. In my experience the radial compression of the clamp upon the shell has been markedly more effective as a seal than the axial pressure against the end of the shell. The clamp need not itself be threaded; this would necessitate turning the clamp and would reduce its sealing efficiency more than the nut-locking and sealing effects gained by the threading are worth.

The clamp is shown as forced down over the thread 37 by nut 38. It forces the shell downwardly against the shoulder or flange 35 and also inwardly against the body of the plug valve and seals at the top. The collar or clamp 27 may be kept from turning by engagement of ears 39 with a web 40 upon the interior of the yoke and this engagement is effective to keep the plug valve from turning in the completed combination. The lower end of this collar or clamp forms a convenient part, movable with the plug valve, to impinge against the upper surface of the stuffing box, as previously indicated, and may be extended as desired for this purpose. The radial contraction of the shell upon the plug valve effectively stops leakage between the shell and body of the valve at this point. There is a further protection against this leakage in the tight joints formed between the shell and the collar or clamp 27, between this collar or clamp and the nut 38 and between the nut and the thread 37.

It will be evident that the material of the shell may be of very slight thickness because it is immediately and fully supported by the body of the valve.

It will be evident that I could expand a single metallic packing by composition packing or by a "floater," with part of the advantage of my invention.

It will be evident that the concavity of the faces of the metallic packing rings prevents the composition packing from being squeezed into the opening in the valve plug when the valve is open, a function which may not be required where a "floater" is used. This function is most desirably performed at both sides of each section of composition packing used and not toward the valve alone. It will be further evident that I effectively hold soft packing from being blown out into the space traversed by the valve, and that I do it by parts which themselves form packing for the valve and which combine with the composition retained to make a more effective packing at all times as well as to improve the adjustment of the packing as a whole.

While I prefer to slope both the inner and outer walls of my metallic packing rings this may not be necessary at all times, as with ring 16′, Fig. 9ª, having but one rib 22′, and may not be necessary at any time where the rings, used as soft-packing retainers only, do not perform a packing function.

It will be evident that a part of the advantage of my invention, i. e., the retention of the soft packing against being blown out or squeezed out, could be attained by concaved rings or corresponding faces of other parts, for example, as of the ring 18, which rings or parts themselves may perform no packing function.

Having thus described my invention, what

I claim as new and desire to secure by Letters Patent is:—

1. In a device of the character stated, a valve body, a plug valve, composition packing for the valve, yielding metallic packing making contact with the composition packing and grooved about the face toward it and means for compressing the metallic and composition packings in the direction of the length of the plug valve.

2. In a device of the character stated, a valve body, a plug valve movable therein, spaced yielding metallic packings for the valve, having faces of wedged section toward each other, a spreader for the metallic packing between the packings adapted to press into the spaces at the side of the wedged surfaces and press the metal of the metallic packings against the valve, and means for pressing the packings and the spreader together in the direction of movement of the valve.

3. In a device of the character stated, a valve body, a valve movable therein, yielding metallic packing for the valve, having a face of wedged section, composition packing forming a spreader for the metallic packing adapted to press into the space at the side of the wedged surface and press the metal of the metallic packing against the valve, and means for pressing the packing and the spreader together in the direction of movement of the valve.

4. In a device of the character stated, a valve body, a valve movable longitudinally therein, spaced yielding metallic packing for the valve having faces each sloping with respect to the path of movement of the valve, the faces sloping on the side of each packing toward the other, and a spreader for the metallic packing adapted to wedge against the sloping faces and press the packing against the valve, in combination with means for pressing the packings and spreader together.

5. In a device of the character stated, a valve body, a valve movable longitudinally therein, spaced yielding metallic packing for the valve having faces each sloping with respect to the path of movement of the valve, the faces being sloped on the side of each packing toward the other, composition packing adapted to engage the sloping surfaces and means for pressing the metallic packings and the composition packing together.

6. In a device of the character stated, a valve body, a valve movable longitudinally therein, metallic packing rings of yielding material having greater extent close to the valve than at a distance from it, the extensions being upon the faces toward each other, packing between the packing rings adapted to press the extensions toward the valve and means for pressing the packings together.

7. In a device of the character stated, a valve body, a valve movable longitudinally therein, packing about the valve, a stuffing box surrounding the valve and adapted to compress the packing, means for moving and holding the packing, and auxiliary means movable with the valve for engaging with the stuffing box and additionally compressing the packing when the valve is closed.

8. In a device of the character stated, a plug valve core having a shoulder, a casing upon the core engaging the shoulder, a cupped clamp for the top of the casing and means connected with the valve core for forcing the clamp against the casing.

9. In a device of the character stated, a valve body, a plug valve movable therein having a shoulder and laterally apertured, a shell surrounding the plug valve core, engaging the shoulder and apertured to correspond with the aperture in the valve and means for compressing the shell against the plug valve core.

10. In a device of the character stated, a valve body, a plug valve core movable therein, having a shoulder, and open at one side, a shell surrounding the plug valve core, engaging the shoulder and open to correspond with the aperture in the valve, and means for pressing the shell longitudinally and radially upon the plug valve core, making it rigid with the core.

11. In a device of the character stated, a valve body, a plug valve core movable therein having a shoulder and laterally apertured, a shell surrounding the plug valve core, engaging the shoulder and apertured to correspond with the aperture in the valve, an internally tapered clamp engaging the outer surface of the shell and a nut connecting with the plug valve core and forcing the clamp longitudinally against the shell.

12. In a device of the character stated, a valve body, a plug valve core movable therein having a shoulder and open at one side, a shell surrounding the plug valve core, engaging the shoulder and open to correspond with the aperture in the valve, the top of the casing being beveled and means engaging the beveled portion for compressing it against the plug valve core, making it rigid with the core.

13. In a device of the character stated, a valve body, a valve core movable therein, a metallic shell surrounding the core and means for compressing the shell in a radial direction against the core to seal thereagainst.

14. In a device of the character stated, a valve body, a valve core movable therein, a metallic shell surrounding the core and closely fitting a portion of the core, means for compressing the shell inwardly against the core where the shell closely fits the core and packing engaging the outside of the shell.

15. In a device of the character stated, a valve body, a valve movable therein, operating mechanism for the valve, soft packing for the valve, passed by the valve in its travel, wedged retainers for the soft packing, one of which itself forms packing for the valve, and means for compressing the packing between the retainers.

16. In a device of the character stated, a valve body, a valve movable therein, operating mechanism for the valve, soft packing for the valve, passed by the valve in its travel, metallic packing engaging the soft packing and retaining it against undue movement into the path of travel of the valve, and means for compressing the packing between the retainers.

DAVID ROBERT YARNALL.

Witnesses:
   WM. STEELL JACKSON,
   WM. HARRISON SMITH.